UNITED STATES PATENT OFFICE.

JOHN C. POOLEY, OF BATH, ENGLAND.

IMPROVEMENT IN COMPOUNDS FOR THE MANUFACTURE OF BREAD.

Specification forming part of Letters Patent No. 158,183, dated December 29, 1874; application filed October 23, 1874.

*To all whom it may concern:*

Be it known that I, JOHN CARPENTER POOLEY, of No. 8 George street, Bath, in the county of Somerset, England, a subject of the Queen of Great Britain, have invented or discovered new and useful Improvements in the Manufacture of Bread and Biscuits; and I, the said JOHN CARPENTER POOLEY, do hereby declare the nature of the said invention, and in what manner the same is to be performed, to be particularly described and ascertained in and by the following statement thereof—that is to say—

This invention consists in the manufacture of bread and biscuits by the use of wheat flour, together with malt flour. I prefer to use the malt in the proportion of about one ounce malt flour to one pound wheat flour.

The malt and wheat may, if desired, be mixed together before grinding, but I prefer that they should be ground separately.

I can make bread with a mixture of wheat flour and malt flour in the usual way without any change in the manufacturing processes, whether fermented or unfermented; but I find the following to be the best plan:

In the manufacture of fermented bread I make the first "sponge," in the usual way, from wheat flour only; I then take the malt flour and mix it with sufficient water, and then carefully heat the mixture in a suitable vessel, stirring it all the time, and continue the application of heat until the mixture first thickens and afteward liquefies again. I then cease the application of heat, and when the mixture is sufficiently cooled I mix it with the sponge, then add the remaining portion of wheat flour and a little salt; then thoroughly incorporate and knead the who.e in the usual way. It is then ready for the oven.

In the manufacture of unfermented bread I follow the same process as to the mixing and heating the malt flour and water together, in the manner described for making fermented bread.

Bread made from flour of wheat and malt, as above described, will be more easy of digestion, more nourishing, more agreeable to the palate, and will keep sweet and moist much longer than ordinary bread.

What I claim is—

Bread consisting of a mixture of malt and wheat flour, substantially as described.

JOHN C. POOLEY.

Witnesses:
   J. M. PAYNE,
      *Solicitor, Bath.*
   E. NEWTON FULLER,
      *His Clerk.*